United States Patent
Vasudevan et al.

(10) Patent No.: US 9,979,640 B2
(45) Date of Patent: May 22, 2018

(54) REORDER RESILIENT TRANSPORT

(71) Applicant: Intel Corporation, Santa Clara, CA (US)

(72) Inventors: Anil Vasudevan, Portland, OR (US); Parthasarathy Sarangam, Portland, OR (US); Eric Mann, Hillsboro, OR (US); Daniel Cohn, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 281 days.

(21) Appl. No.: 14/580,981

(22) Filed: Dec. 23, 2014

(65) Prior Publication Data

US 2016/0182369 A1    Jun. 23, 2016

(51) Int. Cl.
    *G06F 11/00*     (2006.01)
    *H04L 12/741*     (2013.01)
    *H04L 12/801*     (2013.01)
    *H04L 12/873*     (2013.01)
    *H04L 12/863*     (2013.01)
    *H04L 12/721*     (2013.01)

(52) U.S. Cl.
    CPC ............. *H04L 45/74* (2013.01); *H04L 45/38* (2013.01); *H04L 47/115* (2013.01); *H04L 47/52* (2013.01); *H04L 47/54* (2013.01)

(58) Field of Classification Search
    CPC ....... H04L 45/74; H04L 45/38; H04L 47/115; H04L 47/54; H04L 47/52
    USPC .......................................................... 370/235
    See application file for complete search history.

(56) References Cited

U.S. PATENT DOCUMENTS

| | | | | |
|---|---|---|---|---|
| 7,349,399 B1 * | 3/2008 | Chen | ...................... | H04L 49/90 370/394 |
| 2007/0230352 A1 * | 10/2007 | Kokku | .................... | H04L 45/00 370/238 |
| 2009/0259925 A1 * | 10/2009 | Balasubramanian | .. | H04H 60/79 714/807 |

* cited by examiner

*Primary Examiner* — Mang Yeung
(74) *Attorney, Agent, or Firm* — Schwegman Lundberg & Woessner, P.A.

(57) ABSTRACT

Devices and techniques for reorder resilient transport are described herein. A device may store data packets in sequential positions of a flow queue in an order in which the data packets were received. The device may retrieve a first data packet from a first sequential position and a second data packet from a second sequential position that is next in sequence to the first sequential position in the flow queue. The device may store the first data packet and the second data packet in a buffer and refrain from providing the first data packet and the second data packet to upper layer circuitry if the packet order information for the first data packet and the second data packet indicate that the first data packet and the second data packet were received out of order. Other embodiments are also described.

15 Claims, 5 Drawing Sheets

REORDER RESILIENT TRANSPORT

TECHNICAL FIELD

Embodiments described generally herein relate to data centers. Some embodiments relate to improving bandwidth and reducing latency in data center fabrics.

BACKGROUND

Ongoing efforts are directed to improving determinism in latency to enhance performance and usage of available bandwidth in large scale data centers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As consumer data needs have increased, researchers and data center operators have scrutinized deterministic latency in attempts to enhance utilization of available bandwidth in large-scale data centers. One of the contributory factors to lack of latency determinism is the many-to-one communication pattern common in large scale cloud data center workloads such as Map Reduce and Web Search. This many-to-one pattern leads to transmission control protocol (TCP) incast that causes ports on switches to overflow their buffers and to drop data packets. Such problems can lead to unpredictable tail latencies, which can make it more difficult for operators to meet throughput and user response needs for data center applications. A second contributory factor is the presence of elephant flows in data centers that are bandwidth hungry and fill switch buffers. These elephant flows can cause latency-sensitive mice flows behind them to incur additional latency. These and other problems can cause reduced performance and less-than-optimal usage of available bandwidth in the data center.

Researchers have attempted to solve these problems using solutions that can provide early signaling of congestion or lost data packets. However, these efforts have been directed to reducing congestion at the flow level, where a flow includes data packets with the same source port, destination port, protocol, IP source address, and IP destination address. In contrast, embodiments provide enhanced flexibility by providing packet-level congestion relief or mitigation.

Other attempts to mitigate congestion make use of switches that implement out of order data transfers within the fabric, and that reassemble the data packets before the data packets get out of the fabric. However, this approach suffers from state explosion because switches aggregate many ports and each port in turn supports a large number of flows. The applicability of this solution is also restricted based on diameter of the switch fabric, and furthermore may require that switch components from the same vendor be used throughout the fabric. In contrast, example embodiments perform data packet reassembly at the end station, in a stateless or nearly stateless manner, by making use of network interface cards (NICs) using schemes such as receive side scaling (RSS). Further, example embodiments maintain state information in software or logical circuitry, where the state explosion is contained to only flows that are destined for that end station within a small time window. Further, solutions according to example embodiments allow for use of any type of switch from any vendor or combination of vendors, with no limit on the diameter of the switch fabric.

Figure 1:
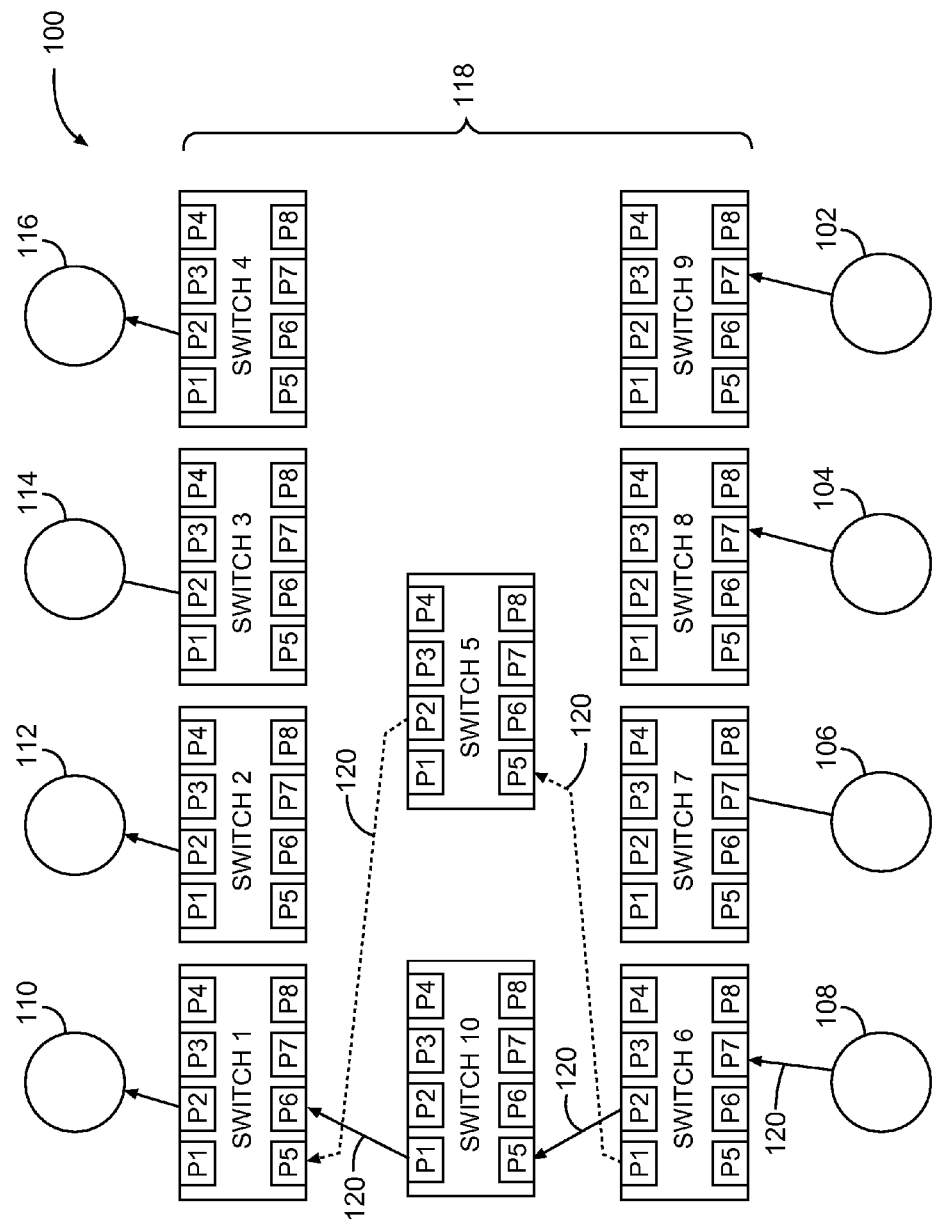
FIG. 1 illustrates a data center environment in which some embodiments can be implemented.

FIG. 1 illustrates a data center environment 100 in which some embodiments can be implemented. In the data center environment 100, end stations 102, 104, 106, 108, 110, 112, 114 and 116 are networked through a fabric 118 formed of switches Switch 1-Switch 10. Switches Switch 1-Switch 10 each include egress port P1-P4 and ingress ports P5-P8. As described in more detail herein, the fabric 118 will be free from ordering constraints in accordance with some embodiments. While 8 ports are described, however, switches Switch 1-Switch 10 can have any number of ports. An end station 108, for example, can initiate a flow 120, comprised of any number of data packets, to another end station 110, for example. While one flow is illustrated, there can be any number of flows generated between any end stations 102, 104, 106, 108, 110, 112, 114 and 116, through any switch or combination of Switches 1 through 10. The fabric architecture can include or be comprised of, e.g., a leaf spine architecture supporting multiple paths from a source to a destination.

In some available data centers, decisions on picking an egress port is fixed on a per-flow basis in the fabric 118. For example, once a switch such as chooses an egress port for a flow, all data packets from that flow always go through the same egress port for the duration of the connection between the corresponding end stations 102, 104, 106, 108, 110, 112, 114 and 116. While flow-based traffic splitting schemes provide some relief with load balancing traffic, allowing for packet level traffic splitting opens up many new possibilities with load balancing. However packet-level traffic splitting introduces out of order packet delivery at the end station that typically causes significant throughput degradation. Embodiments provide a packet level scheduling method that handles out-of-order data packets without causing throughput degradation at the end station.

Embodiments make out-of-order delivery of data packets a legitimate and perhaps a preferred option by providing the ability for end stations to distinguish between dropped data packets versus intentionally-sent out-of-order data packets inside a data center environment 100. Some available techniques for allowing for out-of-order packet delivery provide for the receiver of a duplicate acknowledgement (ACK) with TCP to delay retransmission. However, in contrast to some embodiments, these available techniques do not prevent generation of duplicate ACKs in the first place.

Embodiments allow any switches (e.g., Switch 1-Switch 10) within the fabric 118 to make a decision, unconstrained by flow, of an egress port through which to send, relay or transmit any given data packet. In embodiments, this decision is independent of the port chosen for a previous data packet of the same flow. Switches are free to pick any egress port that can get the data packet to its final destination, e.g., one of end stations 102, 102, 104, 106, 108, 110, 112, 114 or 116. For example, Switch 6 could use Equal Cost Multi Path (ECMP) to determine the egress port P1 for any data packet. Any other data packet can be sent through egress port P1, or any other egress port P2-P4. This may cause data packets to be received out-of-order at the destination end station.

In the example illustrated in FIG. 1, Switch 6 can send data packets from the same flow 120 on through one or several different paths. For example, Switch 6 could send one packet through P1 to the ingress port P5 on Switch 5, and Switch 5 can select an egress port P1 to send that data packet to ingress port P5 of switch 1, to finally reach end station 110 through P2 of Switch 1. Switch 6 could send another data packet of the same flow 120 through P2 to the ingress port P5 on Switch 10, and Switch 10 can select an egress port P1 to send that data packet to ingress port P6 of switch 1, to finally reach end station 110 through P2 of Switch 1.

Reordering algorithms, described below, executing on reordering-resilient end stations, can handle any data packets received out-of-order. The destination end station device executes reordering algorithms in software, processing circuitry, programmable gate arrays, etc, to distinguish between what could be a valid out-of-order data packet delivery versus out-of-order data packet delivery caused by dropped data packets in the data center environment 100. These and other algorithms are described below with respect to FIG. 2-5. Embodiments are described under the assumption that end station 108 is the source of data packets (e.g., "source end station"), and end station 110 is the destination of data packets (e.g., "destination end station") sent by the end station 108. However, it will be understood that concepts described herein can apply to any end station or type of end stations, in the data center environment 100 or outside the data center environment 100.

Figure 2:
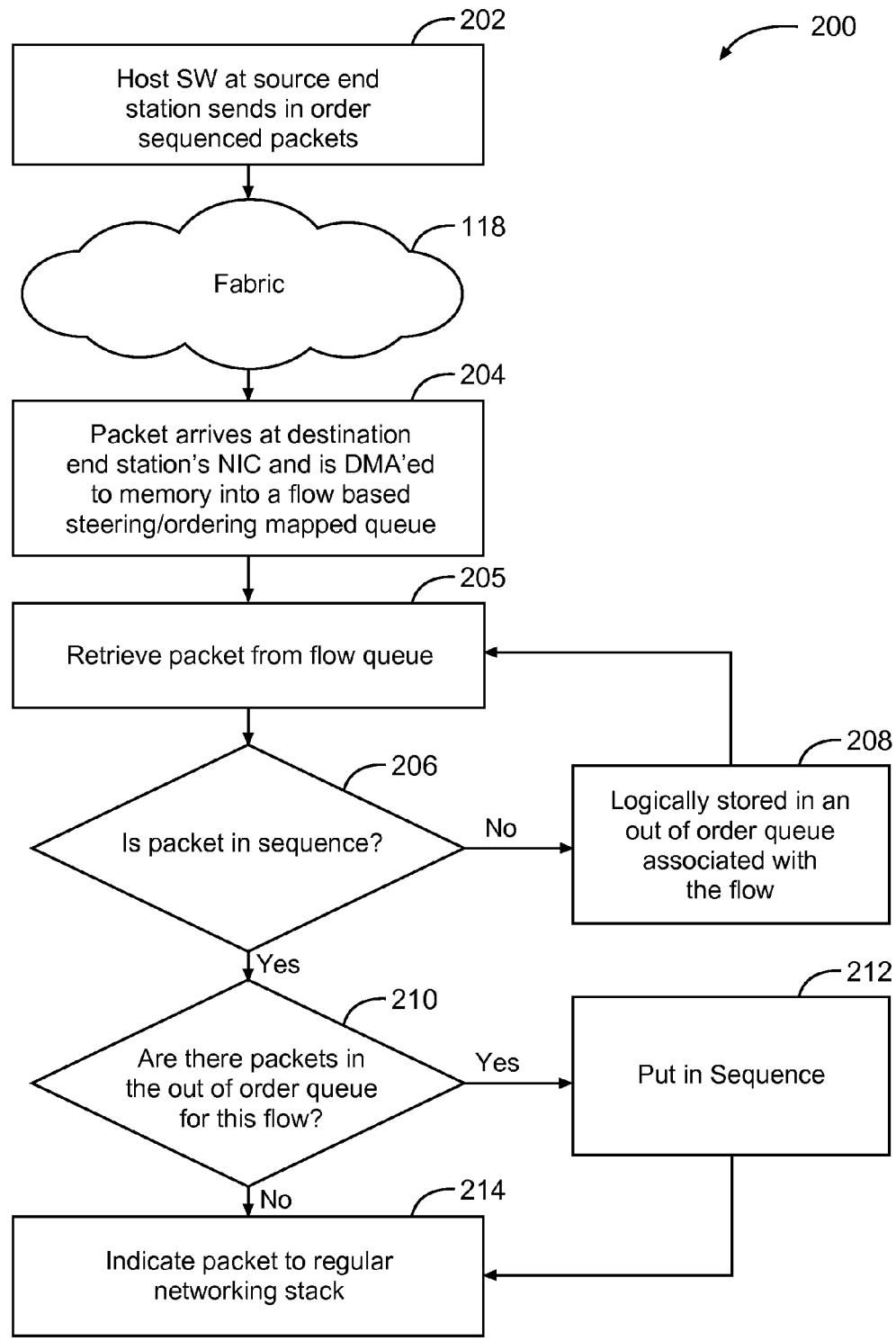
FIG. 2 illustrates a flow chart of an example method in accordance with some embodiments.
Figure 3:
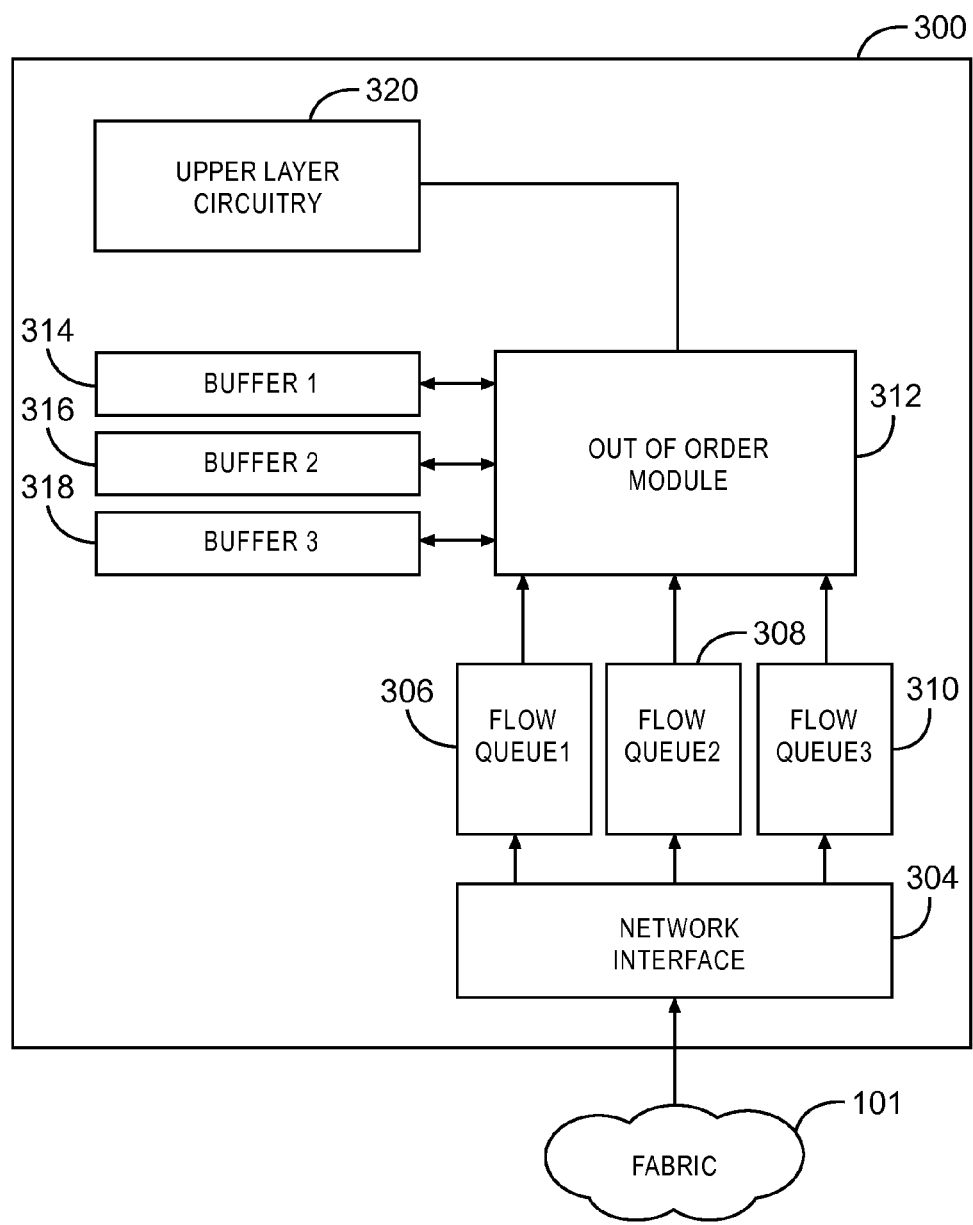
FIG. 3 illustrates a device for reorder-resilient transport in accordance with some embodiments.

FIG. 2 illustrates a flow chart of an example method 200 in accordance with some embodiments. FIG. 3 illustrates a device 300 for reorder resilient transport in accordance with some embodiments. The device 300 can be included in the destination end station 110 or in any other end station in the data center environment 100 or outside the data center. The example method 200 can be implemented by the device 300. Operations of the example method 200 are described with reference to elements of the device 300 or of the data center environment 100.

The example method 200 begins at operation 202, with the source end station 108 (FIG. 1) sending in-order sequenced data packets. The source end station 108 will tag each data packet with a sequence number that is monotonically increasing, for the destination end station 110 to determine ordering. As an example, with network virtualization (e.g., Virtual Extensible Local Area Network (Vx-LAN) or Network Virtualization using Generic Routing Encapsulation (NVGRE)), this sequence number can be added to the encapsulating header. In other cases an IP layer option can provide this function. The data packets arrive at the fabric 118, for example, at Switch 6 (FIG. 1) where, as described earlier herein, Switch 6 can make a decision, unconstrained by flow, of an egress port through which to send, relay or transmit any given data packet.

The example method 200 continues with operation 204, wherein the network interface 304, implemented in, for example, a network interface card (NIC) uses flow-based scheduling to store data packets, received from fabric 118, into sequential positions into a flow queue 306, 308, or 310. All packets of one flow, for example flow 120, will go into a same flow queue. For example, as described earlier herein, the data packets are put into flow queues 306, 308 or 310 based at least on the flow to which each data packet belongs, where a flow includes data packets with the same source port, destination port, protocol, IP source address, and IP destination address. The network interface 304 will store the data packets in sequential positions of the flow queues 306, 308, 310 in the order in which the data packets were received at the network interface 304. Once the network interface 304 stores the data packets for a flow in one of the flow queues 306, 308, or 310, then data packets for that flow will always go into that same flow queue.

The example method 200 continues at operation 205, wherein the out-of-order module 312 retrieves a first data packet having first packet order information from a first sequential position in the flow queue 306, 308 or 310. The out-of-order module 312 can be implemented in hardware circuitry, for example link layer circuitry, or in software. The out-of-order module 312 will then retrieve a second data packet having second packet order information from a second sequential position that is a next sequential position to the first sequential position in the flow queue 306, 308, or 310.

In operation 206, the out-of-order module 312 determines whether the first and second data packets are in sequence based on packet order information within the first and second data packets. In operation 208, the out-of-order module 312 will logically store the first data packet and the second data packet in a buffer 314, 316, 318 if the first packet order information and the second packet order information indicate that the first data packet and the second data packet were received out of order. In some embodiments, the flow queues 306, 308, or 310 themselves can include one of the buffers 314, 316, 318. As described earlier herein, packet order information, including first packet order information and second packet order information, indicate an order in which the first data packet and the second data packet were sent. The packet order information can include tags or other information or indicators that were provided by the source end station 108, for example within packet headers of each data packet. Further, the out-of-order module 312 will refrain from providing the first data packet and the second data packet to upper layer circuitry 320 (e.g., "network layer circuitry") if the first packet order information and the second packet order information indicate that the first data packet and the second data packet were received out of order.

In operations 210 and 214, if the first packet order information and the second packet order information indicate that the first data packet and the second data packet were received in order, the out-of-order module 312 provides the first data packet and the second data packet to the upper layer circuitry 320 if the buffer 314, 316 or 318 is empty. Otherwise, if the buffer 314, 316 or 318 is not empty, the out-of-order module will put the contents of the buffer 314, 316 or 318 into sequential order in operation 212 and transmit the newly in-order buffer 314, 316, or 318 to upper layer circuitry 320.

Otherwise, if the first data packet and the second data packet were out of sequence, the out-of-order module 312 will repeat operations 205, 206, and 208 of retrieving data packets, inspecting packet order information, and logically storing data packets in the buffer 314, 316 or 318 if respective packet order information indicates that the data packets are still out of sequence (i.e., if there is a "missing" data packet).

The out-of-order module 312 will distinguish data packets that were dropped from data packets that intentionally arrive out-of-order using algorithms based on time, counters, or other criteria, or combinations of criteria in various embodiments. For example, in some embodiments, the out-of-order module 312 maintains a counter to track the number of data packets that have been received out-of-order. When a data packet received is out of order, the out-of-order module 312 will increment the counter. The out-of-order module 312 continues to retrieve subsequent data packets, sequentially based on the sequential positions of the data packets, from the flow queue 306, 308, or 310. The out-of-order module 312 will inspect the packet order information of each subsequent retrieved data packet. If the missing data packet has not been retrieved, the out-of-order module 312 will continue to increment the counter, up to the counter limit.

As an illustrative example, the out-of-order module 312 may maintain a counter with a limit of "3." In the illustrative example, the out-of-order module 312 retrieves a first data packet from a first sequential position in the flow queue 306, 308 or 310, and this first data packet includes first packet order information indicating a sequence number "3." Next, the out-of-order module 312 retrieves a second data packet from a second sequential position in the flow queue 306, 308 or 310, and determines that the second data packet includes second packet order information indicating a sequence number "1." At this point, the out-of-order module 312 has detected an out-of-order packet based on the first packet order information and the second packet order information, and the out-of-order module 312 will initialize a counter and logically store the first data packet and the second data packet in a buffer 314, 316 or 318. The out-of-order module 312 will continue retrieving data packets from sequential positions in the flow queue 306, 308, or 310 (up to three data packets in this illustrative example). The out-of-order module 312 will increment the counter after each retrieval that does not retrieve the missing data packet, and logically store the data packets in the buffer 314, 316 or 318. For example, if the third retrieved data packet includes third packet order information indicating a sequence number of "2," then the missing data packet has been retrieved, although the buffer 314, 316 or 318 may need to be reordered before sending data packets from the buffer 314, 316 or 318 to upper layer circuitry 320. The out-of-order module 312 will reorder data packets in the corresponding buffer 314, 316 or 318 into a sequential order based on packet order information for the data packets in the buffer 314, 316 or 318, to generate a reordered buffer, and send the reordered buffer including reordered data packets to upper layer circuitry 320. Otherwise, if data packets are still missing when the counter exceeds a counter limit, the out-of-order module 312 will reorder the contents of the buffer 314, 316 or 318 and transmit the contents to the upper layer circuitry 320, and the upper layer circuitry 320 will handle the data packets as though there were a dropped-packet situation or other error situation in the data center environment 100.

In other embodiments, the out-of-order module 312 uses time-based criteria to determine when to send data packets to upper layer circuitry 320. In some examples, the out-of-order module 312 maintains a timer to keep track of an amount of time for which the out-of-order module 312 will wait for a missing data packet. In some examples, the timer can be based on a value for average round trip travel time for data packets between the source end station 108 and the device 300. However, embodiments are not limited to any particular value for the timer or to any particular method or criteria for determining the amount of time to wait for missing data packets. In at least some timer-based embodiments, the out-of-order module 312 initializes the timer to an initial value responsive to retrieving a data packet from the flow queue 306, 308 or 310. If the respective data packet was received out-of-order, the out-of-order module 312 logically stores that data packet in the buffer 314, 316 or 318. The out-of-order module 312 will then wait until the amount of time set for the timer for the missing data packet has expired. If the timer expires, the out-of-order module 312 will provide the data packets in the buffer 314, 316 or 318 to upper layer circuitry 320.

The out-of-order module 312 can combine timer-based and counter-based criteria for determining when data packets are out of order. For example, in data center environments experiencing bursty traffic, a timer may be used in addition to a counter, to prevent the out-of-order module 312 for waiting a very long time between bursts of traffic for any particular data packet to arrive.

In other embodiments, the out-of-order module 312 may simply wait a certain amount of time before providing any out-of-order data packets to the upper layer circuitry 320. This amount of time can be based on the length of a standard interrupt cycle, or a multiplier of that length. Some embodiments provide a timer to wait for missing data packets for a maximum of, e.g., two interrupt cycles if an out of order data packet was observed, based on packet order information that was added to the data packet at the source end station 108. Given that data packets typically leave a source end station 108 at about the same time, in most non-error situations, two interrupt cycles should be sufficient time to receive missing data packets.

For embodiments in which flows are sent using the TCP protocol, in which case data packets are sent in order because the data packets are reassembled before getting to the TCP layer, the out-of-order module 312 or other software may obtain an indication, from the network interface 304 or the NIC driver (not shown in FIG. 3), of the number of queued data packets of the same flow. This information will provide the out-of-order module 312 (or processing software executing elsewhere in the device 300) with a value or estimate of the number of data packets that the out-of-order module 312 on how many data packets it can afford to wait to allow for reassembly without triggering the traditional out of order handling. The out-of-order module 312 will use that value or estimate for setting counters as described earlier herein.

In some embodiments, operations of detecting missing or out-of-order data packets may be performed at one module of the device 300, whereas reordering buffers 314, 316 or 318 may be performed by a separate module. For example, hardware at the network interface 304 may detect missing data packets and notify the out-of-order module 312 that the data packets are out of order prior to or after storing the data packets in one of the flow queues 306, 308 or 310, while software executing in the out-of-order module 312 or elsewhere in the device 300 may perform reordering of buffers 314, 316 or 318.

Figure 4:
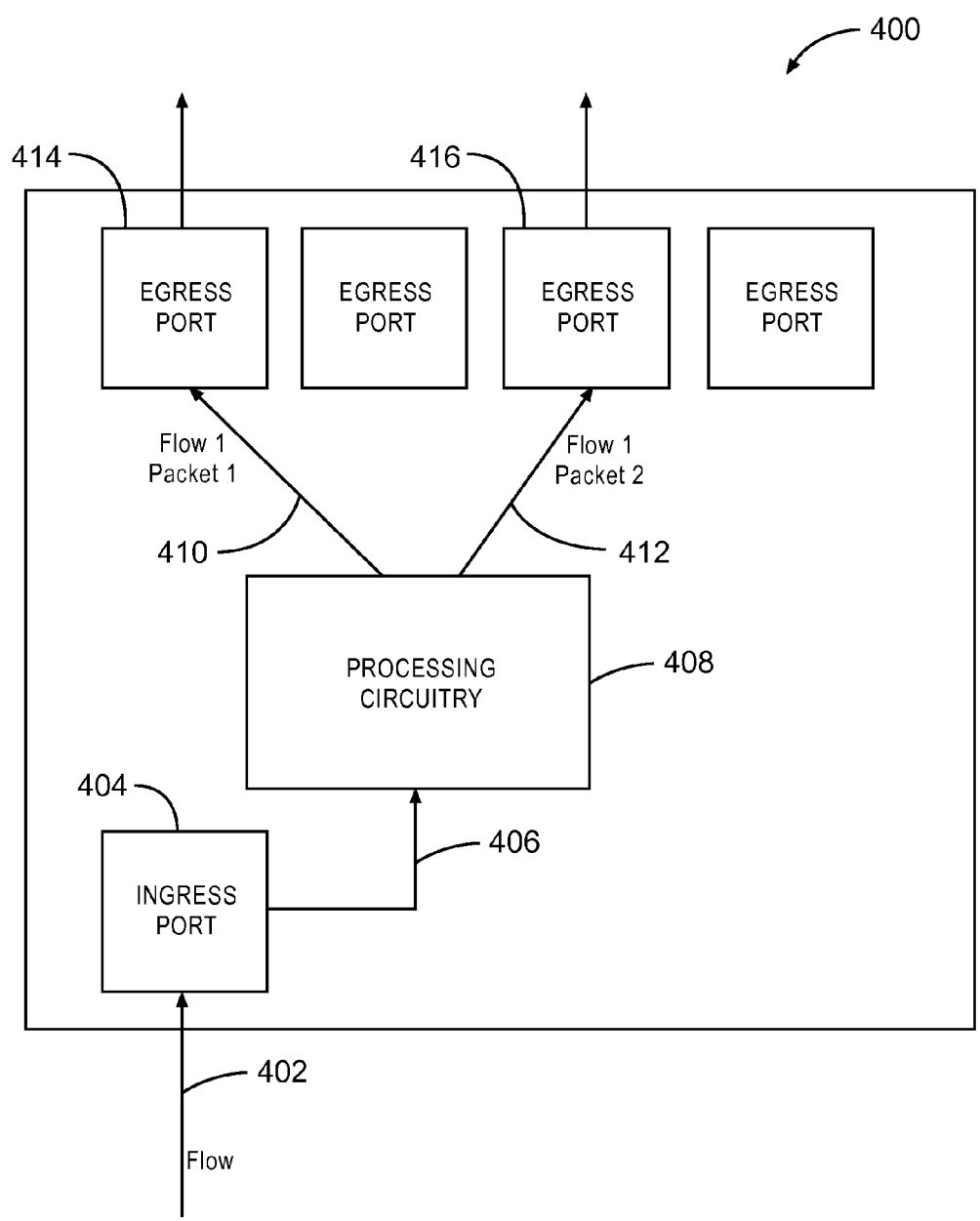
FIG. 4 illustrates a block diagram of a data center fabric entity for reorder-resilient transport in accordance with some embodiments.

FIG. 4 illustrates a block diagram of a data center fabric entity 400 for reorder-resilient transport in accordance with some embodiments. In some embodiments, the data center fabric entity 400 can operate as one of Switches 1-9 (FIG. 1) although embodiments are not limited thereto. The data center fabric entity 400 may be a network router, switch or bridge, or any machine capable of executing instructions (sequential or otherwise) that specify actions to be taken by that machine. The data center fabric entity 400 will include at least one ingress port 404 to receive data packets of a flow from an end station, other data center fabric entity, etc. The data center fabric entity 400 will further include at least two egress ports 414 and 416, although the data center fabric entity 400 can have any number of egress ports and ingress ports.

The data center fabric entity 400 will include processing circuitry 408 to receive data packets 406 of a first flow 402 that were received through the ingress port 404. The processing circuitry 408 will provide a first data packet of the first flow 402 to one egress port 414. However, as described earlier herein, the data center fabric entity 400 is not thereafter constrained from sending all data packets of the first flow 402 through the same egress port 414, and accordingly, in some embodiments, the processing circuitry 408 will provide a second data packet of the flow to a separate egress port 416.

Figure 5:
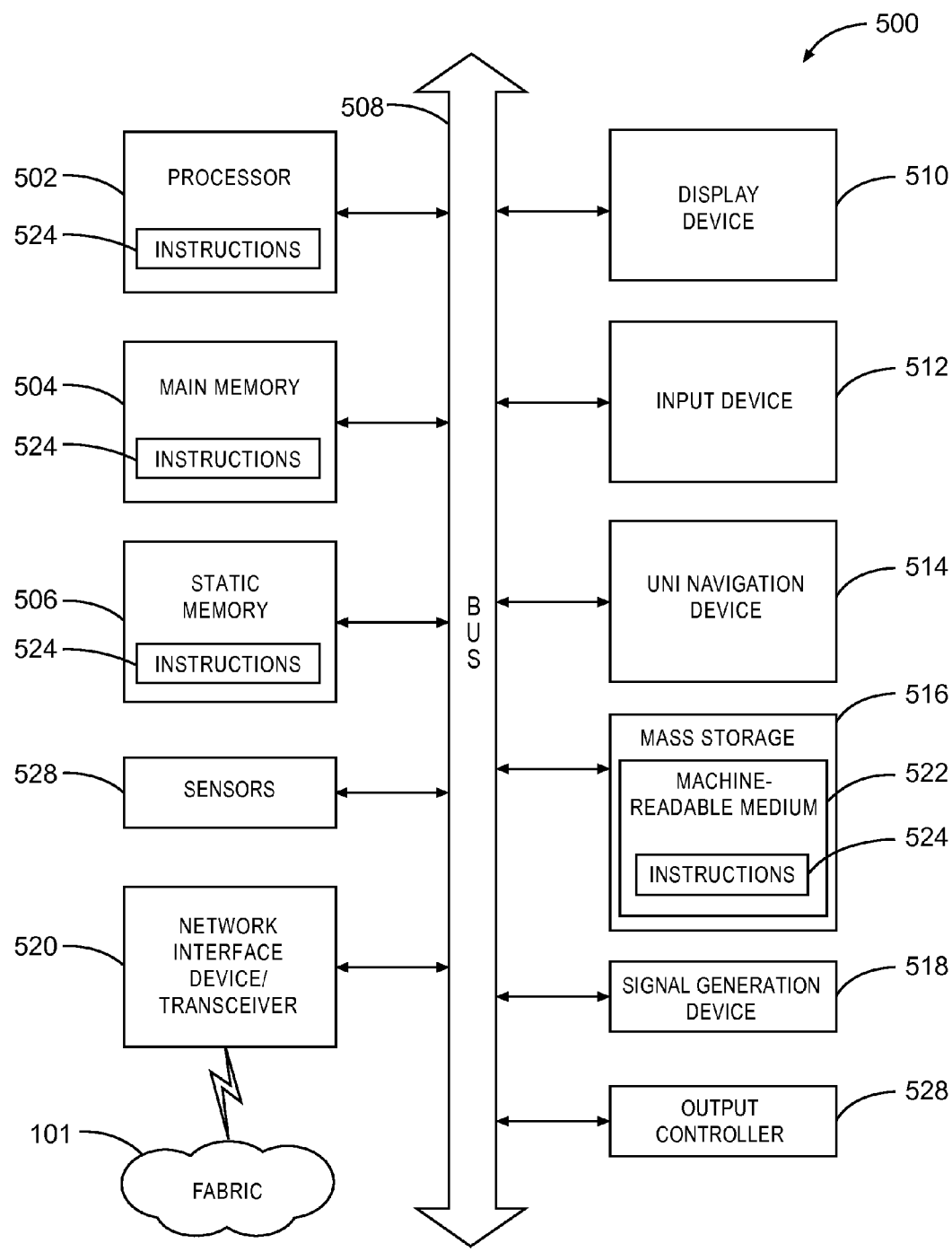
FIG. 5 illustrates a block diagram of an example of a machine that may be used to implement various mechanisms and techniques described herein.

FIG. 5 illustrates a block diagram of an example machine 500 that may be used to implement various mechanisms and techniques described herein. In some embodiments, the machine 500 may operate as an end station 108 (FIG. 1). The machine 500 can be networked to other machines in a network such as the data center environment 100 (FIG. 1) although embodiments are not limited thereto. Network interface device 520 may include most or all components of the device 300 (FIG. 3) for communicating with the fabric 118. The machine 500 may operate in the capacity of a server machine and/or a client machine in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 502 may be configured by firmware or software (e.g., instructions, an application portion, or an application) as a module that operates to perform specified operations. In an example, the software may reside on at least one machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 502 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 500 may include a hardware processor 502 (e.g., a central processing unit (CPU), a graphics processing unit (GPU), a hardware processor core, or any combination thereof), a main memory 504 and a static memory 506, at least some of which may communicate with others via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 418 (e.g., a speaker), and one or more sensors 521, such as a global positioning system (GPS) sensor, compass, accelerometer, or other sensor. The machine 500 may include an output controller 428, such as a serial (e.g., universal serial bus (USB), parallel, or other wired or wireless (e.g., infrared (IR)) connection to communicate or control one or more peripheral devices (e.g., a printer, card reader, etc.).

The storage device 516 may include at least one machine-readable medium 522 on which is stored one or more sets of data structures or instructions 524 (e.g., software) embodying or utilized by any one or more of the techniques or functions described herein. The instructions 524 may also reside, at least partially, in additional machine-readable memories such as on the network interface device 520, main memory 504, static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) that configured to store the one or more instructions 524.

For example, with reference to elements of FIG. 3, the instructions 524 can cause the machine 500 to store a plurality of data packets in sequential positions of a flow queue 306, 308, or 310 in an order in which the plurality of data packets were received. The instructions 524 can further cause the machine 500 to retrieve a first data packet of the plurality of data packets, the first data packet having first packet order information, from a first sequential position in the flow queue 306, 308 or 310. The instructions 524 can cause the machine 500 to retrieve a second data packet having second packet order information, from a second sequential position, the second sequential position being a next sequential position after the first sequential position in the flow queue 306, 308 or 310. As described earlier herein with reference to FIG. 3, the instructions 524 can cause the machine 500 to store the first data packet and the second data packet in a buffer 314, 316 or 318, and to refrain from providing the first data packet and the second data packet to upper layer circuitry 320 if the first packet order information and the second packet order information indicate that the first data packet and the second data packet were received out of order, wherein the first packet order information and the second packet order information indicate an order in which the first data packet and the second data packet were sent.

The term "machine-readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the device 300 utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the device 300 may include one or more physical jacks (e.g., Ethernet, coaxial, or phone jacks) or one or more antennas to connect to the fabric 118. In an example, the device 300 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES & EXAMPLES

Example 1 includes subject matter such as a machine-readable medium including instructions that, when executed on a machine (such as a computing device, NIC card, etc.) cause the machine to store a plurality of data packets in sequential positions of a flow queue in an order in which the plurality of data packets were received; retrieve a first data packet of the plurality of data packets, the first data packet having first packet order information, from a first sequential position in the flow queue; retrieve a second data packet of the plurality of data packets, the second data packet having second packet order information, from a second sequential position, the second sequential position being a next sequential position after the first sequential position in the flow queue; and store the first data packet and the second data packet in a buffer and refrain from providing the first data packet and the second data packet to upper layer circuitry if the first packet order information and the second packet order information indicate that the first data packet and the second data packet were received out of order, wherein the first packet order information and the second packet order information indicate an order in which the first data packet and the second data packet were sent from a second end station.

In Example 2, the subject matter of Example 1 may optionally include further instructions to cause the machine to provide the first data packet and the second data packet to the upper layer circuitry if the buffer is empty and if the first packet order information and the second packet order information indicate that the first data packet and the second data packet were received in order.

In Example 3, the subject matter of any of Examples 1-2 may optionally wherein, if the first packet order information and the second packet order information indicate that the first data packet and the second data packet were received out of order, the instructions further cause the machine to initialize a counter; retrieve a third data packet having third packet order information from a third sequential position that is a next sequential position to the second sequential position in the flow queue; and increment the counter if the buffer does not include data packets in sequential order, based on the first packet order information, the second packet order information, and the third packet order information, subsequent to storing the third data packet.

In Example 4, the subject matter of Example 3 may optionally include instructions to cause the machine to repeat operations of retrieving data packets, incrementing the counter, and storing data packets in the buffer for each of the plurality of data packets, sequentially based on the sequential positions of respective data packets; and provide a reordered buffer to the upper layer circuitry responsive to the counter being incremented past a counter limit, the reordered buffer being generated by reordering the buffer into a sequential order based on packet order information of each data packet in the buffer.

In Example 5, the subject matter of Example 4 may optionally include instructions to cause the machine to responsive to detecting, based on packet order information, that a data packet was received in order, provide a reordered buffer to the upper layer circuitry, the reordered buffer being generated by reordering the buffer into a sequential order based on packet order information of each data packet in the buffer.

In Example 6, the subject matter of any of Examples 1-5 can optionally include instructions to cause the machine to maintain a timer based on a value for average round trip travel time for data packets between the first end station and the second end station; initialize the timer to an initial value responsive to retrieving a data packet of the plurality of data packets; and if the data packet was received out-of-order, based on packet order information for the data packet, store the data packet in the buffer, otherwise, if the timer has expired, provide the data packets in the buffer to the upper layer circuitry.

In Example 7, the subject matter of any of Examples 1-6 can optionally include instructions to cause the machine to increment a counter for each data packet received out of order.

Example 8 includes subject matter (such as a network interface card, computer device and or any other electrical apparatus, device or processor) including a network interface to receive a plurality of data packets and to store the plurality of data packets in sequential positions of a flow queue in an order in which the plurality of data packets were received at the network interface; and an out-of-order module to retrieve a first data packet having first packet order information from a first sequential position in the flow queue, retrieve a second data packet having second packet order information from a second sequential position in the flow queue, and store the first data packet and the second data packet in a buffer and refrain from providing the first data packet and the second data packet to upper layer circuitry if the first packet order information and the second packet order information indicate that the first data packet and the second data packet were received out of order.

In Example 9, the subject matter of Example 8 can optionally include wherein the network interface is to notify the out-of-order module that the plurality of data packets are out of order prior to storing the plurality of data packets in the flow queue.

In Example 10, the subject matter of any of Examples 8-9 can optionally include wherein the out-of-order module is to provide the first data packet and the second data packet to the upper layer circuitry if the buffer is empty and if the first packet order information and the second packet order information indicate that the first data packet and the second data packet were received in order.

In Example 11, the subject matter of any of Examples 8-10 can optionally include wherein, if the first packet information and the second packet order information indicate that the first data packet and the second data packet were received out of order, the out-of-order module is further to initialize a counter; retrieve a third data packet having third packet order information from a third sequential position subsequent to the second sequential position in the flow queue; store the third data packet in the buffer; and increment the counter if the buffer does not include data packets in sequential order, based on the first packet order information, the second packet order information, and the third packet order information, subsequent to storing the third data packet.

In Example 12, the subject matter of Example 11 can optionally include wherein the out-of-order module is further to repeat operations of retrieving data packets, incrementing the counter, and storing data packets in the buffer for each of the plurality of data packets, sequentially based on the sequential positions of respective data packets; and provide a reordered buffer to the upper layer circuitry responsive to the counter being increment past a counter limit, the reordered buffer being generated by reordering the buffer into a sequential order based on packet order information of each data packet in the buffer.

In Example 13, the subject matter of any of Examples 8-12 can further include wherein the out-of-order module is further to maintain a timer based on a value for average round trip travel time for data packets between the device and a source end station; initialize the timer to an initial value responsive to retrieving a data packet of the plurality of data packets; and if the respective data packet is received within the average round trip travel time, store the data packet in the buffer and reorder the buffer based on the respective packet order information, otherwise, if the timer has expired, provide the data packets in the buffer to the upper layer circuitry.

In Example 14, the subject matter of Example 13 can optionally include wherein the out-of-order module is further to increment a counter for each data packet received out of order.

Example 15 includes subject matter include a method, the method comprising storing a plurality of data packets in sequential positions of a flow queue in an order in which the plurality of data packets were received; retrieving a first data packet having first packet order information from a first sequential position in the flow queue; retrieving a second data packet having second packet order information from a second sequential position that is a next sequential position to the first sequential position in the flow queue; and storing the first data packet and the second data packet in a buffer and refrain from providing the first data packet and the second data packet to upper layer circuitry if the first packet order information and the second packet order information indicate that the first data packet and the second data packet were received out of order.

In Example 16, the subject matter of Example 16 can optionally include providing the first data packet and the second data packet to the upper layer circuitry if the buffer is empty and if the first packet order information and the second packet order information indicate that the first data packet and the second data packet were received in order.

In Example 17, the subject matter of any of Examples 15-16 can optionally include repeating operations of retrieving data packets, incrementing the counter, and storing data packets in the buffer for each of the plurality of data packets, sequentially based on the sequential positions of respective data packets; and providing a reordered buffer to the upper layer circuitry responsive to the counter being incremented past a counter limit, the reordered buffer being generated by reordering the buffer into a sequential order based on packet order information of each data packet in the buffer.

In Example 18, the subject matter of any of Examples 15-17 can optionally include initializing a timer responsive to retrieving a data packet of the plurality of data packets; and if a data packet is received before expiration of the timer, store the data packet in the buffer and reorder the buffer based on packet order information of the data packet, otherwise, if the timer has expired, provide the data packets in the buffer to the upper layer circuitry.

Example 19 includes subject matter such as a network switch or other element as can be included in a data center fabric (such as a computing device, a compute blade, a processor, or other electrical or electronic apparatus) including a first egress port and a second egress port; an ingress port; and processing circuitry to receive data packets of a first flow, including at least a first data packet and a second data packet, through the ingress port, and provide the first data packet of a first flow to the first egress port and to provide the second data packet of the first flow to the second egress port.

In Example 20, the subject matter of Example 19 can optionally include wherein the processing circuitry is further to provide a first data packet of a second flow to the first egress port and to provide a second data packet of the second flow to the first egress port.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A non-transitory machine-readable medium including instructions that, when executed by a first end station, cause the first end station to:
   store a plurality of data packets in sequential positions of a flow queue in an order in which the plurality of data packets were received;
   retrieve a first data packet of the plurality of data packets, the first data packet having first packet order information, from a first sequential position in the flow queue;
   retrieve a second data packet of the plurality of data packets, the second data packet having second packet order information, from a second sequential position, the second sequential position being a next sequential position after the first sequential position in the flow queue;
   store the first data packet and the second data packet in a buffer and refrain from providing the first data packet and the second data packet to upper layer circuitry responsive to the first packet order information and the second packet order information indicate that the first data packet and the second data packet were received out of order, wherein the first packet order information and the second packet order information indicate an order in which the first data packet and the second data packet were sent from a second end station;
   maintain a timer based on a value for average round trip travel time for data packets between the first end station and the second end station;
   initialize the timer to an initial value responsive to retrieving a data packet of the plurality of data packets; and
   responsive to the data packet was received out-of-order, based on packet order information for the data packet, store the data packet in the buffer, otherwise, responsive to the timer has expired, provide the data packets in the buffer to the upper layer circuitry.

2. The non-transitory machine-readable medium of claim 1, including further instructions that, when executed by the first end station, cause the first end station to:
   provide the first data packet and the second data packet to the upper layer circuitry responsive to the buffer is empty and responsive to the first packet order information and the second packet order information indicate that the first data packet and the second data packet were received in order.

3. The non-transitory machine-readable medium of claim 1, wherein, responsive to the first packet order information and the second packet order information indicate that the first data packet and the second data packet were received out of order, the instructions further cause the first end station to:
   initialize a counter;
   retrieve a third data packet having third packet order information from a third sequential position that is a next sequential position to the second sequential position in the flow queue;
   store the third data packet in the buffer; and
   increment the counter responsive to the buffer does not include data packets in sequential order, based on the first packet order information, the second packet order information, and the third packet order information, subsequent to storing the third data packet.

4. The non-transitory machine-readable medium of claim 3, wherein the instructions further cause the first end station to:
   repeat operations of retrieving data packets, incrementing the counter, and storing data packets in the buffer for each of the plurality of data packets, sequentially based on the sequential positions of respective data packets; and
   provide a reordered buffer to the upper layer circuitry responsive to the counter being incremented past a counter limit, the reordered buffer being generated by reordering the buffer into a sequential order based on packet order information of each data packet in the buffer.

5. The non-transitory machine-readable medium of claim 4, wherein the instructions further cause the first end station to:
responsive to detecting, based on packet order information, that a data packet was received in order, provide a reordered buffer to the upper layer circuitry, the reordered buffer being generated by reordering the buffer into a sequential order based on packet order information of each data packet in the buffer.

6. The non-transitory machine-readable medium of claim 1, wherein the instructions further cause the first end station to: increment a counter for each data packet received out of order.

7. A device comprising:
a network interface to receive a plurality of data packets and to store the plurality of data packets in sequential positions of a flow queue in an order in which the plurality of data packets were received at the network interface; and
an out-of-order module to:
retrieve a first data packet having first packet order information from a first sequential position in the flow queue, retrieve a second data packet having second packet order information from a second sequential position in the flow queue,
store the first data packet and the second data packet in a buffer and refrain from providing the first data packet and the second data packet to upper layer circuitry responsive to the first packet order information and the second packet order information indicate that the first data packet and the second data packet were received out of order,
maintain a timer based on a value for average round trip travel time for data packets between the device and a source end station,
initialize the timer to an initial value responsive to retrieving a data packet of the plurality of data packets, and
responsive to the respective data packet is received within the average round trip travel time, store the data packet in the buffer and reorder the buffer based on the respective packet order information, otherwise, responsive to the timer has expired, provide the data packets in the buffer to the upper layer circuitry.

8. The device of claim 7, wherein the network interface is to notify the out-of-order module that the plurality of data packets are out of order prior to storing the plurality of data packets in the flow queue.

9. The device of claim 7, wherein the out-of-order module is further to:
provide the first data packet and the second data packet to the upper layer circuitry responsive to the butler is empty and responsive to the first packet order information and the second packet order information indicate that the first data packet and the second data packet were received in order.

10. The device of claim 7, wherein, responsive to the first packet information and the second packet order information indicate that the first data packet and the second data packet were received out of order, the out-of-order module is further to:
initialize a counter;
retrieve a third data packet having third packet order information from a third sequential position subsequent to the second sequential position in the flow queue;
store the third data packet in the buffer; and
increment the counter responsive to the buffer does not include data packets in sequential order, based on the first packet order information, the second packet order information, and the third packet order information, subsequent to storing the third data packet.

11. The device of claim 10, wherein the out-of-order module is further to:
repeat operations of retrieving data packets, incrementing the counter, and storing data packets in the buffer for each of the plurality of data packets, sequentially based on the sequential positions of respective data packets; and
provide a reordered buffer to the upper layer circuitry responsive to the counter being increment past a counter limit, the reordered buffer being generated by reordering the buffer into a sequential order based on packet order information of each data packet in the buffer.

12. The device of claim 7, wherein the out-of-order module is further to:
increment a counter for each data packet received out of order.

13. A method comprising:
storing a plurality of data packets in sequential positions of a flow queue in an order in which the plurality of data packets were received;
retrieving a first data packet having first packet order information from a first sequential position in the flow queue;
retrieving a second data packet having second packet order information from a second sequential position that is a next sequential position to the first sequential position in the flow queue;
storing the first data packet and the second data packet in a buffer and refrain from pro viding the first data packet and the second data packet to upper layer circuitry responsive to the first packet order information and the second packet order information indicate that the first data packet and the second data packet were received out of order, wherein the first packet order information and the second packet order information indicate an order in which the first, data, packet, and the second data packet were sent from a second end station;
maintaining a timer based on a value for average round trip travel time for data packets between the first end station and the second end station;
initializing the timer to an initial value responsive to retrieving a data packet of the plurality of data packets; and
responsive to the data packet was received out-of-order, based on packet order information for the data packet, storing the data packet in the buffer, otherwise, responsive to the timer has expired, pro viding the data packets in the buffer to the upper layer circuitry.

14. The method of claim 13, further comprising:
providing the first data packet and the second data packet to the upper layer circuitry responsive to the buffer is empty and responsive to the first packet order information and the second packet order information indicate that the first data packet and the second data packet were received in order.

15. The method of claim 13, further comprising:
repeating operations of retrieving data packets, incrementing a counter, and storing data packets in the buffer for each of the plurality of data packets, sequentially based on the sequential positions of respective data packets; and providing a reordered buffer to the upper layer circuitry responsive to the counter being incremented past a counter limit, the reordered buffer being generated by reordering the buffer into a sequential order based on packet order information of each data packet in the buffer.

* * * * *

UNITED STATES PATENT AND TRADEMARK OFFICE
CERTIFICATE OF CORRECTION

PATENT NO. : 9,979,640 B2  
APPLICATION NO. : 14/580981  
DATED : May 22, 2018  
INVENTOR(S) : Vasudevan et al.

Page 1 of 1

It is certified that error appears in the above-identified patent and that said Letters Patent is hereby corrected as shown below:

In the Claims

In Column 16, Line 35, in Claim 13, delete "pro viding" and insert --providing-- therefor In Column 16, Line 53, in Claim 13, delete "pro viding" and insert --providing-- therefor Signed and Sealed this  
Twenty-eighth Day of April, 2020

Andrei Iancu  
*Director of the United States Patent and Trademark Office*